United States Patent
Avis et al.

(10) Patent No.: US 7,625,590 B2
(45) Date of Patent: Dec. 1, 2009

(54) IN-CANISTER PRODUCT COOLING

(75) Inventors: Benjamin Adam Avis, Little Elm, TX (US); Joseph Paul Sagel, Highland Village, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1090 days.

(21) Appl. No.: 10/410,707

(22) Filed: Apr. 9, 2003

(65) Prior Publication Data

US 2004/0208958 A1 Oct. 21, 2004

(51) Int. Cl.
*A21D 15/02* (2006.01)
(52) U.S. Cl. .................. 426/392; 426/394; 426/438; 426/439; 426/497
(58) Field of Classification Search .................. 426/392, 426/394, 438, 439, 496, 497, 524, 549, 560, 426/128; 53/432, 440, 447, 127, 531, 471, 53/475, 467
See application file for complete search history.

(56) References Cited

U.S. PATENT DOCUMENTS

| | | | | |
|---|---|---|---|---|
| 3,498,798 A | * | 3/1970 | Baur et. al. | 426/124 |
| 3,988,875 A | * | 11/1976 | Fay | 53/514 |
| 4,052,838 A | * | 10/1977 | Hilton et al. | 53/531 |
| 4,120,984 A | * | 10/1978 | Richardson et al. | 426/412 |
| 4,426,401 A | * | 1/1984 | Ottow et al. | 426/394 |
| 4,899,884 A | * | 2/1990 | Madsen | 206/499 |
| 4,985,269 A | | 1/1991 | Irvin et al. | |
| 5,096,723 A | * | 3/1992 | Turpin | 426/107 |
| 6,001,411 A | * | 12/1999 | Kester et al. | 426/637 |
| 6,032,438 A | * | 3/2000 | Sanfilippo et al. | 53/432 |
| 6,510,674 B1 | * | 1/2003 | Case | 53/452 |
| 6,588,363 B1 | * | 7/2003 | Burke et al. | 118/13 |
| 6,713,107 B2 | * | 3/2004 | Shefet et al. | 426/315 |
| 2002/0122852 A1 | * | 9/2002 | Zimmerman et al. | 426/285 |

FOREIGN PATENT DOCUMENTS

GB 1580442 A * 12/1980

* cited by examiner

*Primary Examiner*—Lien Tran
(74) *Attorney, Agent, or Firm*—Colin P. Cahoon; Chad E. Walter; Carstens & Cahoon, LLP (57) ABSTRACT

Snack products are cooled after stacking in a rigid container by blowing cooled, dry area into the containers. The process provides sufficient cooling to prevent implosion of the rigid containers under conditions of changing temperature and pressure yet requires much less space than conventional cooling.

22 Claims, 4 Drawing Sheets

IN-CANISTER PRODUCT COOLING

BACKGROUND OF THE INVENTION

1. Technical Field

The present invention relates to the packaging of food products and specifically it relates to the packaging of cooked food products that must be cooled before packaging is completed. Even more specifically, the invention relates to packaging of porous, snack foods that are packaged in rigid containers.

2. Description of Related Art

A variety of packaging techniques have been used to package prepared food products. These can loosely be grouped into flexible, semi-rigid, or rigid packages. With products such as formed potato chips, which have a regular shape for stacking, rigid or semi-rigid containers can be used.

Figure 1A:
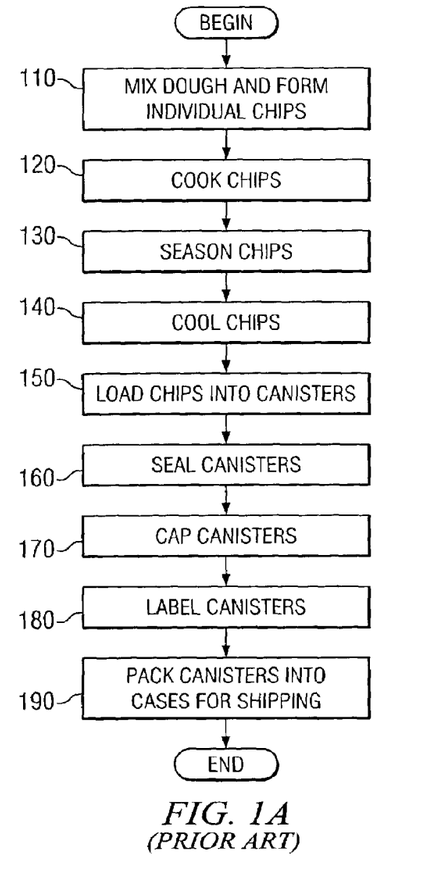
FIGS. 1A and 1B show respectively a flowchart and a production line for producing and packaging a stackable chip according to the prior art.
Figure 1B:
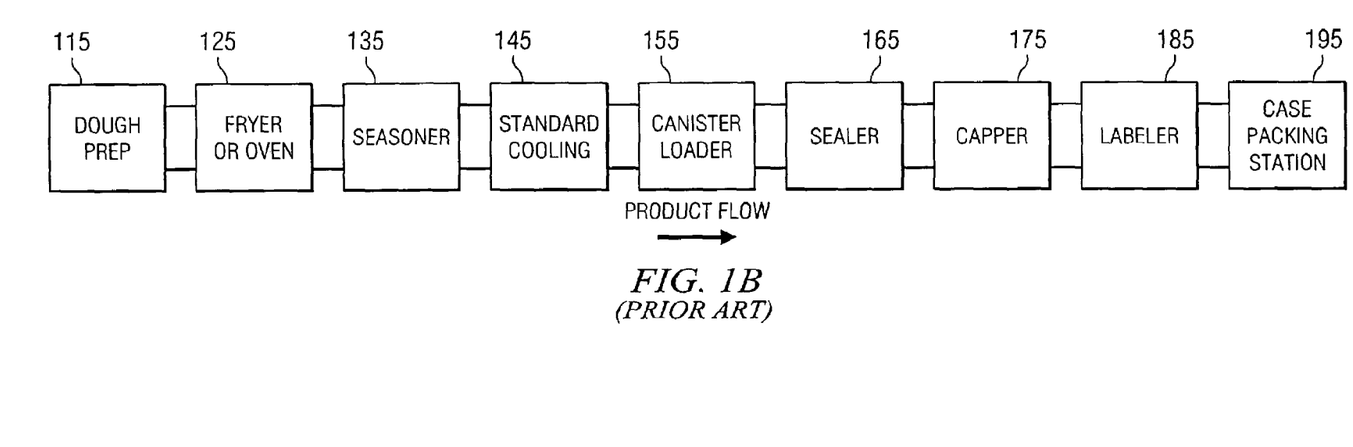
Figure 2A:
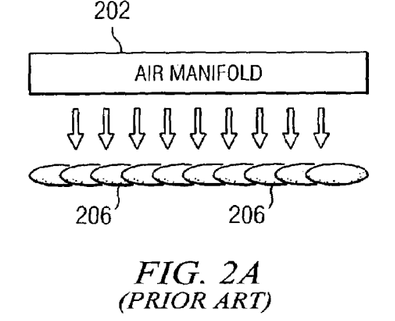
FIGS. 2A and 2B show a line of chips as they pass a cooling station according to the prior art.
Figure 2B:
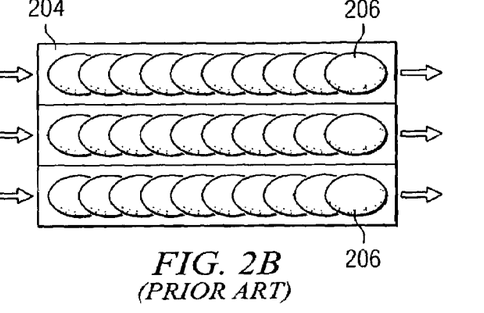

In an exemplary situation, a product, such as a formed potato chip is produced and packaged in a process shown in FIG. 1A. During the process, the chips will travel down a production line, the layout of which is shown in FIG. 1B, where the layout of the line closely parallels the process. In this process, the product is first prepared for cooking (step 110) at the dough preparation area 115. Generally, potato flakes are mixed with water and other ingredients to make a potato dough. The dough is preferably chilled to make handling easier, then rolled out on a sheeter to form a flat sheet of dough, and cut into individual chips. The chips are then cooked as by baking or frying (step 120) in an oven or fryer 125 to a predetermined color and dryness, depending on the desired product. Once the chips have been cooked, an optional seasoning may be applied (step 130) to the top of the chips at seasoning station 135. This seasoning step must take place prior to the time the temperature of the chips falls below about 150° F. or the seasoning will not stick to the chips. The chips are cooled (step 140) at cooling station 145 by forcing cold air over the chips as they move through this step. FIGS. 2A and 2B illustrate the chips 206 moving along a conveyor belt 204 at the cooling station 145, with cooling air being blown down on them from air manifold 202. It has been generally considered that the most efficient method of cooling the chips would be to present them in a single layer as they pass under the manifold, although this takes up a large amount of linear space to allow the chips to be spread out in this fashion while cooling. A compromise situation is shown in FIG. 2A, where the chips 206 are overlapped to present a portion of their surface to the cooling air but not take up as much room in the line. As shown in FIG. 2B, several rows of chips 206 can move side-by-side through the cooling station 145. The air used for cooling must be blown at a low velocity to ensure that the seasoning is not blown away or the chips misaligned by the airflow. Thus the rate of heat transfer and the subsequent cooling of the chips is limited by the available air velocity. When the chips have reached an acceptable temperature, they are stacked and loaded into a canister (step 150) at the canister loader 155. A seal is first applied (step 160) to the top of the canister at the sealer 165 to ensure freshness and prevent tampering, then the canister is capped (step 170) at the capper 175 with a reusable cap for consumer use. The canisters are labeled (step 180) at the labeler 185 and packaged in cases (step 190) at the case packing station 195 for distribution to the consumer. Depending on the specific product, these can be shipped to various locations worldwide.

One problem encountered when the product is packaged in a rigid package is the inability of a rigid package to change shape with changes of the environment, such as temperature and pressure. When the product is packaged while still hot, a large pressure differential can develop between the inside and the outside of a sealed, rigid package, particularly if the package is subsequently stored at a lower altitude or a colder temperature.

The assignee of this application has designed a rigid canister made of a composite material in which to package formed chip products, such as the formed potato chips discussed above. The canister has been designed with an inherent strength to resist an internal vacuum that is created at packaging, but if the conditions under which the product is stored differ too much from the conditions under which it was packaged, the vacuum within the package can cause the package to implode.

The temperature at which the product is packaged is a key variable in the creation and extent of the vacuum within the canister. There is typically a large amount of airspace in a canister of formed chips, due to the space between each pair of chips, the inherent porosity of the chips, and the space between the chips and the sidewalls and top of the canister. The contained gas will shrink significantly in volume with cooling temperatures. It should be noted in passing that the formation of a strong vacuum is not an issue with liquids in a rigid container, since they generally have only a small airspace. To avoid the relatively large vacuum that can be generated when food products such as stacked potato chips are sealed in a rigid container, the current practice in the industry is to cool the product prior to packaging, as shown in the method of FIG. 1A. It has been an axiom of engineering that more efficient cooling will be achieved if the product is cooled in a mono-layer bed with forced air, but as mentioned above, this concept imposes problems of its own, namely 1) the provision of space to cool the product, 2) the integration of seasoning with cooling, 3) the prevention of oil strippage, and, when products are stacked, 4) the prevention of movement of the product during cooling. Each of these problems will be discussed.

1) For a facility in which food products are cooked and packaged, the space required to keep the product in a mono-layer for cooling can add to the cost of both machinery and floor space. In an exemplary situation, a stack of chips spread out in a horizontal, mono-layer fashion for cooling can add on the order of 27 inches of horizontal space to the line for each canister of chips. Adding this much space to multiple lines that package a given product can be a significant expense just for cooling.

2) Many products are seasoned after cooking. As seen in FIG. 1A, seasoning is generally done prior to cooling the chips in order to enhance the seasoning adhesion to the product. However, once the chips are seasoned, the use of high velocity air can cause much of the seasoning to be blown off the chip, which of course affects taste and/or cost. To avoid this, the velocity of air must be reduced, further increasing the time, and therefore distance, that must be allocated for cooling. This, again, adds to the cost.

3) For non-seasoned chips, blowing high velocity air onto the chip can strip its surface oil. Lowering the level of oil in the finished product can adversely affect the taste and consumer acceptability, so air velocity must remain low even for unseasoned chips.

4) Because the product to be packaged in the rigid container is first stacked, the use of high velocity air can blow the chips out of position, affecting the stacking mechanism. Like items 2) and 3) above, the solution to this problem requires lower velocities of air and longer distances for cooling.

Thus, the current technology of cooling for stacked chips has a high capital expense. It would be desirable to find another method of cooling a stackable food product that did not have these drawbacks.

SUMMARY OF THE INVENTION

In the inventive method, the product is stacked and placed in the canister while still at an elevated temperature, then cooled in the canister prior to sealing. An accumulation table is used to stage filled canisters for a period of time under a cooling manifold, then the canisters are sealed, capped, and placed in cases. Testing has shown this method to be quite effective, although this is contrary to general engineering principles that would point against this method.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

An embodiment of the innovative invention will now be described with reference to FIGS. 3-8.

Figure 3:
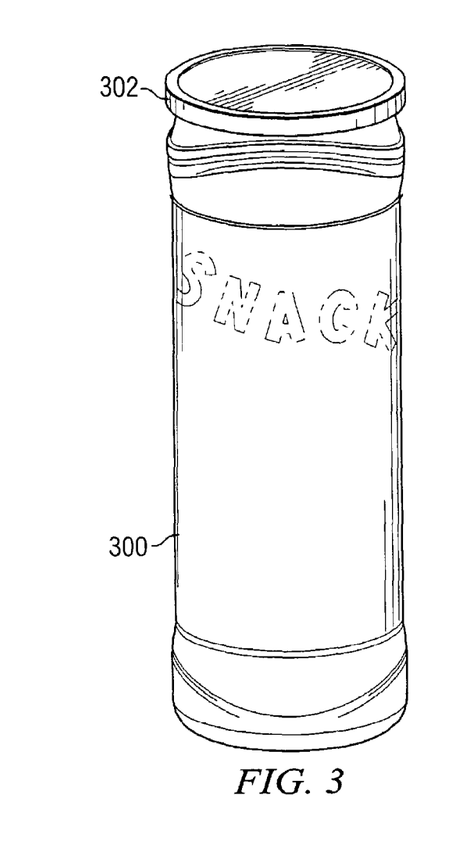
FIG. 3 shows an exemplary rigid canister that has been tested in an embodiment of the present invention.

FIG. 3 shows a rigid canister 300 that is contemplated by the applicants to be used for packaging formed snacks, such as the formed potato chips discussed above. This canister has a generally oval cross-section designed to conform to the shape of the formed chips inside. Both the canister 300 and cap 302 are formed of a plastic material and it has been found that when the pressure differential between the inside and the outside of the canister is too great, the canister will implode. Since this can erode overall consumer satisfaction as well as cause loss of product or product quality, the disclosed method was developed and tested to reduce or eliminate the possibility of canister implosion.

Figure 4A:
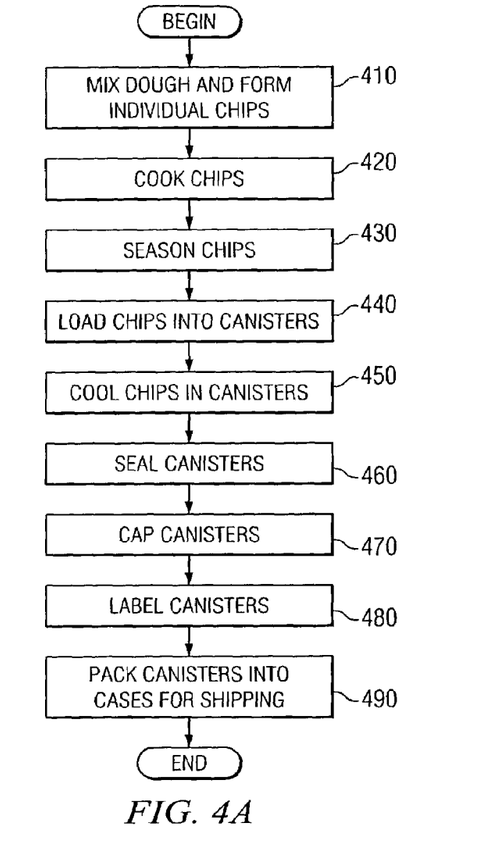
FIGS. 4A and 4B show respectively a flowchart and a production line for producing and packaging a stackable chip in accordance with an embodiment of the present invention.
Figure 4B:
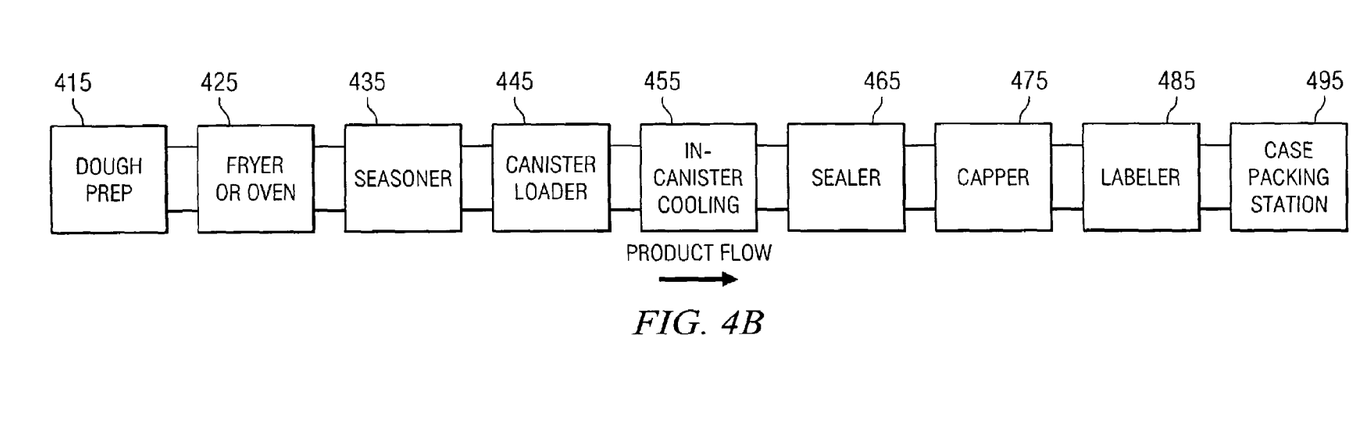
Figure 5A:
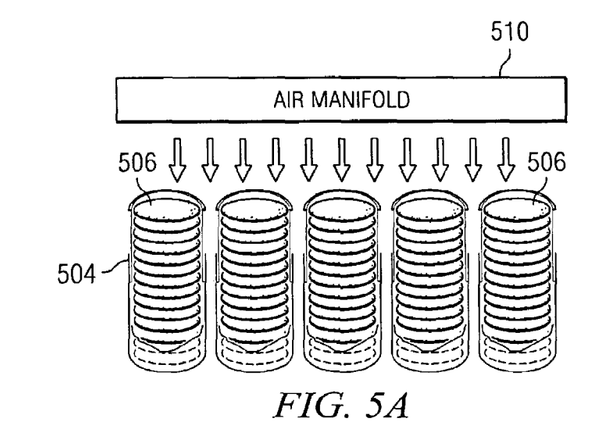
FIG. 5A and 5B shows the chips in canisters as they pass through the cooling station accordance with one embodiment of the present invention.
Figure 5B:
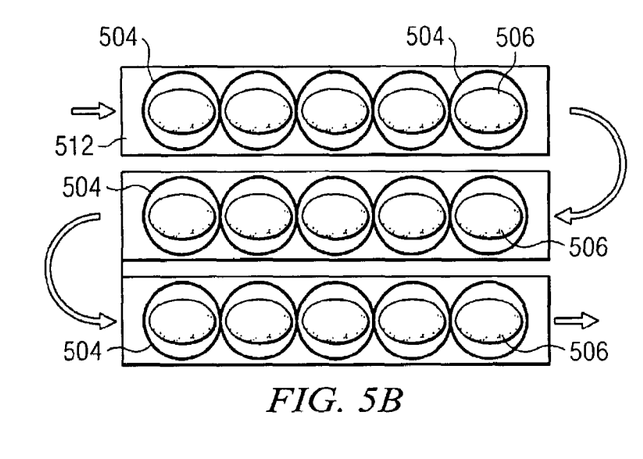

FIGS. 4A and 4B show the method and production line for a stackable snack product according to an embodiment of the invention. The method and production line represented by these drawings are similar to the method and production line shown in FIGS. 1A and 1B, except that the cooling station and canister loading station have been reversed. Other specific differences will be discussed as the innovative process is described. In the innovative process, the product is prepared for cooking (step 410) at the dough preparation area 415. The chips are cooked (step 420) in a fryer or oven 425 and optionally seasoned (step 430) at seasoning station 435. Prior to cooling, the chips are stacked and loaded into canisters (step 440) at canister loading station 445. Depending on the type of canisters being used and whether they are loaded from the top or bottom, the chips can be loaded either seasoned side downward or seasoned side upward. The chips are next cooled (step 450) at cooling station 455 by blowing relatively high velocity cold air into the canisters. FIG. 5A is a cross-section of a row of canisters 504 containing chips 506 and illustrates the line as the chips 506 move underneath the air manifold 510. In the presently preferred embodiment, a compact, serpentine conveyor 512, shown in FIG. 5B, is used to achieve the desired dwell-time. In one embodiment of the invention, the air used for cooling was successfully introduced at velocities over 30 kilometers/hour. This velocity is impractical to use in prior art cooling scenarios, for the reasons discussed previously, although the high flow of air is a distinct advantage from the standpoint of providing cooling. After cooling, the canisters proceed to be sealed (step 160) at the sealer 165, capped (step 170) at the capper 175, labeled (step 180) at the labeler 185, and packaged in cases (step 190) at the case packing station 195.

Figure 6:
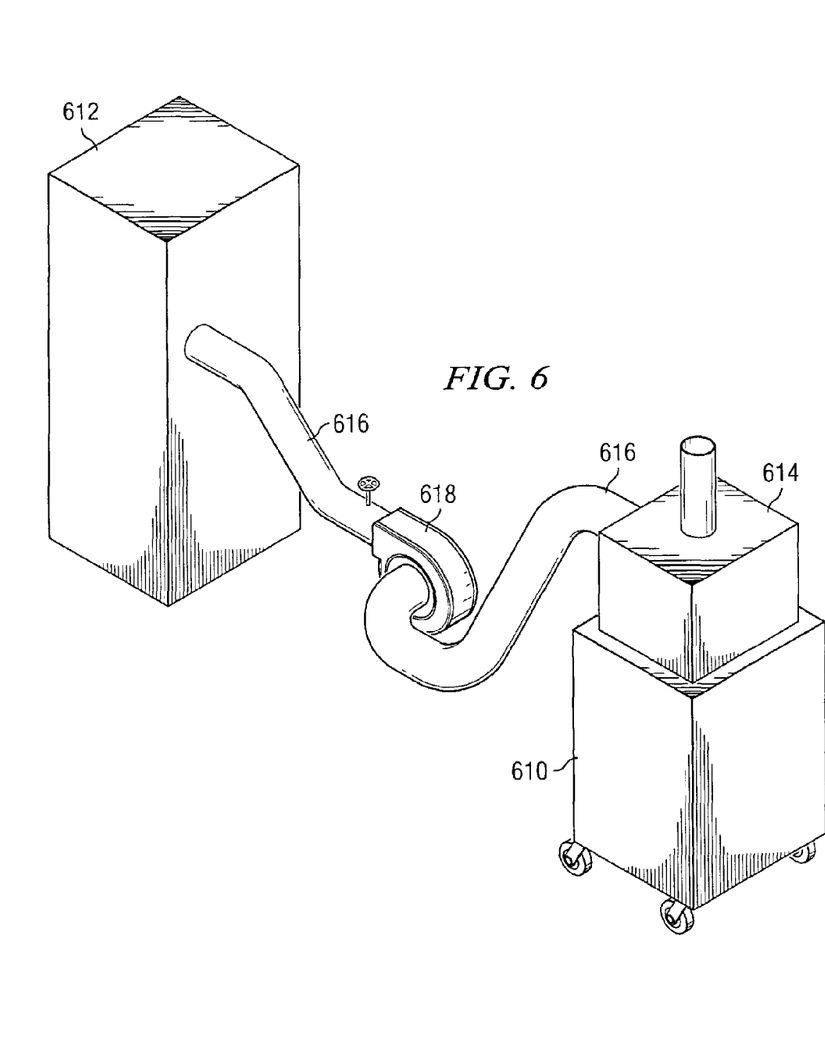
FIG. 6 shows an exemplary cooling system that can be used to implement the process of FIG. 4.

FIG. 6 shows an exemplary cooling system that can be used for the cooling station 455 in the production line shown in FIG. 4A. In one embodiment, an air conditioning unit 610 is used to supply cold air to the cooling manifold 612 through a plenum 614 and 4-inch ducting 616. A high-pressure direct-drive blower fan 618, having a volume of 940 cubic feet per minute, can be used to maintain pressure and velocity at the manifold 612, where the air is directed downwardly into the canisters. The manifold 612 can be mounted on an accumulation conveyor so that containers will pass under the manifold for a set time.

Figure 7:
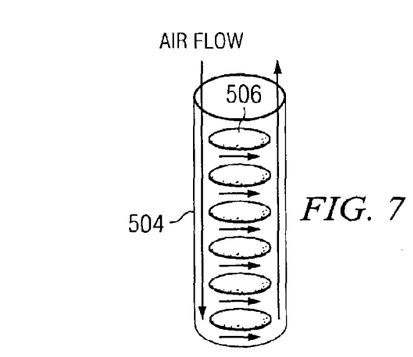
FIG. 7 shows airflow through a canister in an embodiment of the present invention.

FIG. 7 shows a cross-section through a filled canister 504, showing airflow possibilities through the canister in an embodiment of the present invention. Because of the large amount of airspace within the canister 504, the chips 506 are able to act as a radiator, dissipating heat quickly. An exemplary mass of stacked chips weighing 7 ounces has a volume of 500 ml; however, the actual chip volume, as measured by porosity, is 186 ml. The difference (500-186, or 314 ml) is the amount of air space within the chip stack. The large volume of air creates very efficient cooling, on the order of monolayer principles, although in a vertical mode.

Figure 8:
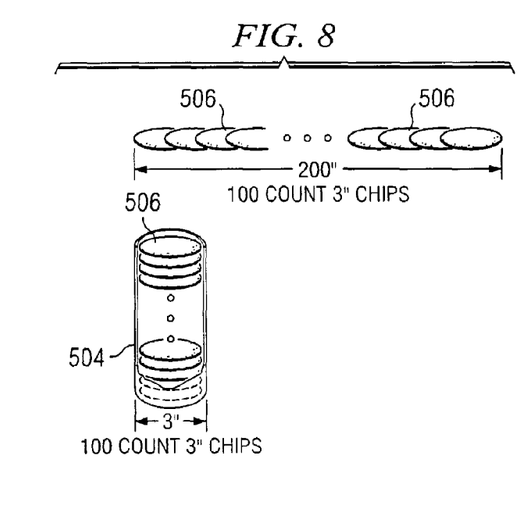
FIG. 8 shows a comparison of the space requirements for cooling in the prior art and in an embodiment of the present invention.

FIG. 8 shows a comparison of the space requirements for cooling in the prior art and in an embodiment of the present invention. In this example, one hundred round or elliptical chips 506, each having a major diameter of three inches are shingled or somewhat overlapped for traditional cooling, taking up two hundred inches of space. Using the innovative cooling method, the same one hundred chips in a canister 504 take up only three inches.

One embodiment of the invention was demonstrated in a production line using three different flavorings of a chip product, with a quantity of packaged product being followed to their destination to determine the presence and/or rate of implosion of the canisters. Two portable air-conditioners were used to supply cold air to the cooling station. The two air conditioning units had a rating of 18,010 BTU/hour and were plumbed in parallel; their input air temperature was measured at 73° F. and their output temperature into the manifold at 52° F. After cooking, the chips were seasoned and loaded into canisters as described above. Except for the control canisters, the canistered chips were run through the innovative canister cooling system for a period of about five minutes. Control canisters did not pass through the canister cooling, but were sealed immediately. A number of samples were diverted to go through the cooling system twice. All canisters were then sealed. Immediately after sealing, temperatures were measured at various locations within the containers, with an infrared thermometer, using the average core temperature method. Tables giving the temperatures recorded are shown in Tables 1-7 below.

Table 1 below shows the temperatures measured within the control canisters, which did not receive canister cooling, for the first flavoring in which minimal seasonings were added.

TABLE 1

Chip with First Seasoning - Control

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 60.6 | 88.9 | 90.0 | 86.7 | 87.2 | 87.8 | 86.1 | 85.6 | 60.6 | 81.5 |
| 2 | 61.1 | 78.3 | 92.2 | 88.9 | 80.0 | 83.9 | 79.4 | 67.8 | 46.7 | 75.4 |
| 3 | 62.8 | 88.3 | 89.4 | 87.2 | 87.2 | 86.1 | 87.2 | 84.4 | 58.3 | 81.2 |
| 4 | 67.2 | 88.9 | 90.0 | 87.2 | 88.3 | 90.0 | 81.1 | 87.8 | 57.2 | 82.0 |
| 5 | 65.6 | 87.2 | 86.7 | 86.7 | 87.2 | 86.7 | 88.3 | 87.8 | 58.3 | 81.6 |
| 6 | 66.7 | 87.8 | 89.4 | 87.8 | 87.8 | 87.8 | 88.9 | 82.8 | 53.9 | 81.4 |
| 7 | 63.9 | 87.2 | 90.6 | 90.6 | 92.2 | 88.3 | 84.4 | 78.3 | 57.2 | 81.4 |
| 8 | 62.8 | 87.8 | 90.0 | 90.0 | 88.9 | 88.3 | 91.1 | 91.1 | 58.9 | 83.2 |
| 9 | 61.1 | 90.0 | 89.4 | 90.0 | 90.6 | 86.7 | 85.6 | 85.0 | 57.2 | 81.7 |
| 10 | 60.0 | 81.7 | 83.3 | 82.2 | 89.4 | 91.1 | 86.7 | 59.4 | 46.1 | 75.6 |
| 11 | 67.2 | 86.1 | 85.0 | 87.2 | 87.8 | 87.2 | 85.0 | 87.2 | 55.6 | 80.9 |
| 12 | 60.0 | 87.2 | 88.3 | 86.1 | 85.0 | 85.6 | 84.4 | 77.8 | 52.2 | 78.5 |
| 13 | 65.0 | 83.3 | 85.0 | 87.2 | 86.7 | 85.6 | 85.6 | 84.4 | 52.2 | 79.4 |
| 14 | 68.3 | 87.2 | 84.4 | 87.2 | 86.1 | 86.1 | 90.6 | 86.7 | 58.3 | 81.7 |
| 15 | 57.2 | 83.9 | 81.7 | 87.8 | 85.6 | 87.2 | 85.6 | 78.3 | 55.6 | 78.1 |
| 16 | 61.7 | 85.0 | 81.1 | 85.0 | 84.4 | 83.9 | 78.3 | 80.6 | 51.1 | 76.8 |
| 17 | 66.7 | 85.0 | 81.1 | 85.0 | 83.9 | 87.8 | 82.2 | 83.3 | 57.8 | 79.2 |
| 18 | 58.3 | 78.3 | 82.2 | 80.0 | 79.4 | 78.3 | 81.1 | 67.2 | 53.3 | 73.1 |
| 19 | 67.2 | 82.2 | 84.4 | 87.8 | 85.6 | 85.6 | 86.7 | 86.7 | 57.2 | 80.4 |
| 20 | 62.8 | 85.6 | 88.3 | 82.2 | 87.2 | 85.6 | 83.3 | 75.6 | 50.6 | 77.9 |
| 21 | 64.4 | 85.6 | 85.0 | 82.2 | 85.6 | 83.3 | 83.3 | 83.3 | 51.1 | 78.2 |
| 22 | 56.7 | 87.8 | 84.4 | 86.1 | 87.8 | 84.4 | 87.2 | 85.0 | 52.8 | 79.1 |
| 23 | 61.1 | 87.2 | 86.7 | 87.8 | 86.1 | 83.3 | 84.4 | 82.8 | 52.2 | 79.1 |
| 24 | 65.0 | 80.0 | 83.9 | 86.1 | 84.4 | 83.9 | 83.9 | 82.2 | 57.2 | 78.5 |
| 25 | 63.9 | 80.0 | 82.2 | 81.7 | 81.1 | 82.2 | 81.1 | 76.1 | 55.0 | 75.9 |

Table 2 then follows a set of canisters that contain the identical product to Table 1, but which have been routed through the in-canister cooling system.

TABLE 2

Chip with First Seasoning - In-Canister Cooling (° C.)

Temperature at Percent of Distance Down from Top of Canister

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 43.9 | 66.7 | 66.7 | 66.1 | 68.9 | 63.3 | 61.7 | 46.7 | 33.9 | 57.5 |
| 2 | 43.3 | 62.8 | 65.6 | 64.4 | 63.3 | 61.1 | 55.6 | 42.8 | 31.7 | 54.5 |
| 3 | 42.2 | 61.7 | 66.1 | 66.1 | 67.8 | 61.7 | 60.0 | 53.9 | 28.3 | 56.4 |
| 4 | 43.9 | 61.1 | 64.4 | 63.9 | 65.0 | 61.1 | 63.9 | 55.6 | 28.9 | 56.4 |
| 5 | 44.4 | 66.1 | 66.7 | 66.1 | 64.4 | 63.9 | 59.4 | 51.1 | 28.3 | 56.7 |
| 6 | 36.7 | 50.6 | 56.1 | 55.0 | 48.3 | 57.8 | 56.7 | 46.1 | 27.8 | 48.3 |

TABLE 2-continued

Chip with First Seasoning - In-Canister Cooling (° C.)

Temperature at Percent of Distance Down from Top of Canister

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 7 | 45.6 | 66.1 | 63.9 | 63.9 | 63.3 | 62.8 | 60.0 | 58.9 | 31.7 | 57.3 |
| 8 | 41.7 | 63.3 | 65.6 | 63.3 | 63.3 | 63.3 | 60.6 | 38.3 | 26.7 | 54.0 |
| 9 | 46.1 | 63.9 | 66.1 | 63.9 | 61.7 | 65.0 | 65.0 | 53.9 | 32.8 | 57.6 |
| 10 | 42.8 | 63.3 | 62.2 | 61.1 | 60.6 | 57.2 | 48.9 | 37.8 | 26.1 | 51.1 |
| 11 | 42.2 | 62.2 | 63.9 | 64.4 | 63.3 | 62.8 | 63.9 | 55.0 | 31.7 | 56.6 |
| 12 | 43.9 | 61.7 | 62.2 | 61.7 | 60.0 | 61.1 | 55.6 | 50.0 | 30.6 | 54.1 |
| 13 | 44.4 | 65.6 | 67.2 | 59.4 | 59.4 | 55.0 | 51.7 | 45.0 | 28.9 | 53.0 |
| 14 | 45.0 | 62.2 | 62.2 | 59.4 | 60.0 | 62.2 | 53.9 | 51.7 | 30.0 | 54.1 |
| 15 | 41.7 | 57.2 | 61.1 | 58.9 | 62.2 | 57.8 | 58.3 | 45.6 | 27.2 | 52.2 |
| 16 | 43.9 | 65.0 | 66.7 | 66.1 | 66.1 | 63.9 | 69.4 | 62.8 | 38.3 | 60.2 |
| 17 | 42.8 | 57.8 | 64.4 | 67.2 | 66.1 | 67.8 | 51.1 | 44.4 | 26.7 | 54.3 |
| 18 | 42.2 | 60.0 | 61.1 | 58.9 | 60.0 | 56.1 | 51.1 | 48.3 | 31.1 | 52.1 |
| 19 | 42.8 | 62.2 | 65.6 | 71.1 | 69.4 | 65.6 | 57.2 | 35.0 | 27.8 | 55.2 |
| 20 | 40.6 | 60.0 | 61.7 | 60.0 | 60.0 | 51.7 | 35.6 | 27.2 | 24.4 | 46.8 |
| 21 | 39.4 | 58.3 | 60.6 | 60.0 | 62.8 | 61.7 | 56.1 | 53.3 | 31.7 | 53.8 |

Simply by scanning the average temperature of the canisters, it is seen that the product cooled in-canister tends to exhibit average temperatures in the fifties, while product that did not receive in-canister cooling tended to have an average temperature in the seventies and eighties.

Tables 3 and 4 below are the same type chips, but with a different seasoning, which affects the temperature and cooling somewhat.

TABLE 3

Chip with Second Seasoning - Control

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 56.1 | 79.4 | 81.1 | 78.9 | 80.0 | 80.6 | 76.1 | 66.7 | 45.0 | 71.5 |
| 2 | 47.2 | 68.9 | 69.4 | 72.2 | 72.8 | 72.2 | 73.9 | 73.3 | 50.6 | 66.7 |
| 3 | 50.6 | 73.9 | 73.3 | 73.9 | 68.9 | 71.7 | 67.8 | 70.0 | 59.4 | 67.7 |
| 4 | 50.6 | 71.1 | 72.2 | 73.3 | 71.1 | 72.2 | 71.7 | 73.3 | 46.1 | 66.9 |
| 5 | 53.3 | 73.9 | 73.9 | 73.9 | 73.9 | 74.4 | 73.9 | 74.4 | 50.0 | 69.1 |
| 6 | 48.3 | 69.4 | 71.1 | 71.7 | 72.2 | 73.3 | 74.4 | 66.7 | 42.8 | 65.6 |
| 7 | 55.6 | 73.3 | 74.4 | 72.2 | 73.9 | 72.2 | 74.4 | 72.8 | 36.7 | 67.3 |
| 8 | 52.8 | 71.7 | 71.7 | 71.7 | 71.7 | 72.2 | 73.3 | 71.1 | 45.6 | 66.9 |
| 9 | 54.4 | 71.7 | 70.0 | 74.4 | 72.2 | 73.9 | 73.9 | 67.8 | 46.7 | 67.2 |
| 10 | 53.9 | 75.0 | 73.3 | 75.6 | 74.4 | 76.1 | 75.0 | 71.7 | 43.3 | 68.7 |

Table 4 demonstrates the effectiveness of the canister cooling on this second type of seasoning.

TABLE 4

Chip with Second Seasoning - Test

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 40.6 | 57.2 | 60.0 | 60.0 | 61.7 | 63.9 | 60.0 | 52.2 | 30.0 | 54.0 |
| 2 | 44.4 | 64.4 | 67.2 | 66.1 | 65.6 | 65.6 | 56.7 | 33.9 | 30.0 | 54.9 |
| 3 | 42.8 | 61.1 | 62.8 | 63.3 | 59.4 | 56.7 | 59.4 | 52.2 | 32.2 | 54.4 |
| 4 | 40.6 | 60.0 | 62.8 | 61.1 | 51.7 | 55.6 | 51.1 | 37.8 | 31.7 | 50.2 |
| 5 | 40.0 | 56.1 | 60.0 | 58.3 | 55.0 | 55.0 | 52.2 | 44.4 | 31.7 | 50.3 |
| 6 | 42.2 | 51.7 | 64.4 | 64.4 | 63.9 | 59.4 | 55.0 | 57.2 | 31.1 | 54.4 |
| 7 | 44.4 | 62.2 | 66.1 | 63.9 | 68.9 | 67.8 | 47.2 | 32.2 | 30.6 | 53.7 |
| 8 | 39.4 | 56.1 | 61.7 | 62.8 | 62.8 | 63.3 | 61.1 | 58.3 | 32.8 | 55.4 |
| 9 | 45.0 | 60.6 | 61.7 | 62.8 | 63.3 | 61.7 | 55.0 | 49.4 | 31.7 | 54.6 |
| 10 | 37.8 | 53.9 | 58.3 | 59.4 | 61.1 | 57.2 | 46.1 | 30.6 | 29.4 | 48.2 |
| 11 | 40.6 | 58.9 | 63.3 | 60.6 | 62.2 | 56.7 | 52.8 | 43.3 | 31.7 | 52.2 |
| 12 | 36.1 | 58.3 | 60.0 | 58.9 | 60.6 | 63.9 | 62.2 | 58.3 | 32.2 | 54.5 |
| 13 | 40.0 | 56.1 | 61.7 | 63.9 | 62.2 | 61.7 | 59.4 | 45.6 | 29.4 | 53.3 |

TABLE 4-continued

Chip with Second Seasoning - Test

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 14 | 40.6 | 61.1 | 62.2 | 60.6 | 59.4 | 58.9 | 59.4 | 55.0 | 29.4 | 54.1 |
| 15 | 39.4 | 59.4 | 59.4 | 60.6 | 60.6 | 58.9 | 53.9 | 38.9 | 29.4 | 51.2 |
| 16 | 41.1 | 68.9 | 71.7 | 71.1 | 68.9 | 67.8 | 63.9 | 27.8 | 31.7 | 57.0 |
| 17 | 41.7 | 61.1 | 60.0 | 65.0 | 64.4 | 64.4 | 62.8 | 56.7 | 33.9 | 56.7 |
| 18 | 41.7 | 62.2 | 62.2 | 62.2 | 62.8 | 62.2 | 60.0 | 56.7 | 30.0 | 55.6 |
| 19 | 41.7 | 63.3 | 63.9 | 66.1 | 64.4 | 58.3 | 59.4 | 38.3 | 33.3 | 54.3 |
| 20 | 41.7 | 61.1 | 66.1 | 64.4 | 63.3 | 64.4 | 57.2 | 50.6 | 35.6 | 56.0 |
| 21 | 41.1 | 59.4 | 62.2 | 65.0 | 65.6 | 62.8 | 62.2 | 49.4 | 30.6 | 55.4 |
| 22 | 40.6 | 60.0 | 60.0 | 62.8 | 62.8 | 60.0 | 52.8 | 38.3 | 29.4 | 51.9 |
| 23 | 38.3 | 53.3 | 61.7 | 62.2 | 61.7 | 57.8 | 53.9 | 41.7 | 28.3 | 51.0 |
| 24 | 43.9 | 60.0 | 61.1 | 61.7 | 58.9 | 54.4 | 46.7 | 33.3 | 32.2 | 50.2 |
| 25 | 43.3 | 63.9 | 65.6 | 66.1 | 65.6 | 64.4 | 63.3 | 50.6 | 30.6 | 57.0 |

This seasoning, too, showed effective in-canister cooling, although not as much as with the first seasoning. Canisters that were not cooled showed temperatures after sealing generally in the mid-to-high-sixties, while the cooled product showed temperatures generally in the mid-to-low fifties. A third seasoning combination on the chip product was also tested for in-canister cooing. Table 5 shows temperatures after sealing for the control group having the third seasoning.

TABLE 5

Chip with Third Seasoning - Control

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 58.9 | 72.8 | 72.2 | 70.6 | 75.0 | 75.0 | 71.7 | 74.4 | 57.2 | 69.8 |
| 2 | 55.0 | 74.4 | 72.8 | 73.9 | 73.9 | 74.4 | 77.8 | 74.4 | 63.3 | 71.1 |
| 3 | 49.4 | 70.6 | 71.7 | 71.7 | 69.4 | 66.1 | 72.2 | 71.1 | 50.6 | 65.9 |
| 4 | 52.8 | 70.6 | 72.8 | 72.8 | 72.8 | 72.8 | 69.4 | 71.1 | 49.4 | 67.2 |
| 5 | 55.6 | 72.8 | 72.2 | 73.3 | 72.8 | 71.7 | 72.8 | 74.4 | 50.0 | 68.4 |
| 6 | 55.0 | 73.9 | 73.9 | 75.6 | 78.3 | 76.7 | 77.8 | 77.2 | 57.8 | 71.8 |
| 7 | 55.6 | 73.9 | 75.6 | 71.1 | 74.4 | 72.8 | 73.3 | 75.6 | 72.2 | 71.6 |
| 8 | 55.0 | 73.3 | 73.9 | 73.9 | 76.7 | 75.0 | 73.9 | 76.1 | 58.3 | 70.7 |
| 9 | 56.1 | 72.8 | 75.0 | 73.9 | 74.4 | 73.9 | 76.1 | 73.3 | 48.9 | 69.4 |
| 10 | 50.0 | 70.6 | 70.0 | 69.4 | 75.6 | 73.3 | 73.3 | 70.0 | 48.3 | 66.7 |

As in the earlier runs, a group of chips of this seasoning were run through the cooling manifold; their results are seen in Table 6.

TABLE 6

Third Seasoning - One Pass Through Cooler

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 44.4 | 67.2 | 66.1 | 66.1 | 66.7 | 66.1 | 63.9 | 59.4 | 36.7 | 59.6 |
| 2 | 45.0 | 65.0 | 64.4 | 62.2 | 61.1 | 58.9 | 41.1 | 42.8 | 31.1 | 52.4 |
| 3 | 40.6 | 60.6 | 61.7 | 59.4 | 58.3 | 58.3 | 53.9 | 46.1 | 32.8 | 52.4 |
| 4 | 38.9 | 57.8 | 61.7 | 61.1 | 59.4 | 55.0 | 51.1 | 44.4 | 32.8 | 51.4 |
| 5 | 40.0 | 53.9 | 60.6 | 59.4 | 57.8 | 53.3 | 50.6 | 45.0 | 33.9 | 50.5 |
| 6 | 44.4 | 63.3 | 63.9 | 62.2 | 62.2 | 62.8 | 61.1 | 37.8 | 28.3 | 54.0 |
| 7 | 34.4 | 48.9 | 52.8 | 53.9 | 55.6 | 56.7 | 52.8 | 50.6 | 32.8 | 48.7 |
| 8 | 43.9 | 60.6 | 62.2 | 65.6 | 66.1 | 63.3 | 56.1 | 29.4 | 27.2 | 52.7 |
| 9 | 40.0 | 53.9 | 58.3 | 58.3 | 58.3 | 55.6 | 51.7 | 48.3 | 31.1 | 50.6 |
| 10 | 41.1 | 55.6 | 58.3 | 57.2 | 56.7 | 56.1 | 58.9 | 50.0 | 32.2 | 51.8 |
| 11 | 43.9 | 67.2 | 66.1 | 66.1 | 66.1 | 64.4 | 50.0 | 48.3 | 30.0 | 55.8 |
| 12 | 42.2 | 60.6 | 62.2 | 61.1 | 61.7 | 58.9 | 56.1 | 41.1 | 28.3 | 52.5 |
| 13 | 41.1 | 52.8 | 62.8 | 62.8 | 60.6 | 61.7 | 48.9 | 30.0 | 33.3 | 50.4 |
| 14 | 42.2 | 60.0 | 60.0 | 60.6 | 59.4 | 57.2 | 50.0 | 43.3 | 31.7 | 51.6 |
| 15 | 40.0 | 57.2 | 56.7 | 57.2 | 57.8 | 56.7 | 52.8 | 41.1 | 28.3 | 49.8 |
| 16 | 43.9 | 61.7 | 62.8 | 61.7 | 63.9 | 53.9 | 49.4 | 42.2 | 30.0 | 52.2 |

TABLE 6-continued

Third Seasoning - One Pass Through Cooler

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 17 | 32.8 | 58.3 | 60.6 | 61.1 | 56.1 | 52.2 | 42.8 | 42.2 | 31.7 | 48.6 |
| 18 | 41.7 | 60.6 | 60.0 | 61.1 | 58.9 | 61.1 | 56.1 | 39.4 | 27.2 | 51.8 |
| 19 | 40.6 | 56.1 | 58.9 | 60.0 | 58.9 | 58.9 | 55.6 | 53.9 | 30.6 | 52.6 |
| 20 | 38.9 | 51.1 | 57.2 | 55.0 | 60.0 | 58.3 | 56.1 | 52.8 | 33.3 | 51.4 |
| 21 | 44.4 | 63.9 | 65.0 | 64.4 | 63.3 | 63.3 | 61.7 | 47.2 | 32.2 | 56.2 |
| 22 | 42.8 | 62.2 | 63.9 | 63.9 | 62.2 | 60.0 | 55.0 | 35.0 | 32.2 | 53.0 |
| 23 | 43.9 | 55.0 | 48.3 | 60.6 | 60.0 | 58.3 | 55.6 | 55.6 | 29.4 | 51.9 |
| 24 | 41.7 | 56.7 | 57.2 | 56.7 | 56.7 | 58.3 | 46.7 | 35.0 | 28.3 | 48.6 |
| 25 | 40.6 | 58.3 | 57.8 | 57.2 | 56.7 | 55.6 | 51.1 | 35.6 | 31.1 | 49.3 |

Finally, the canisters for a third group of chips having the third seasoning were diverted to run through the cooler twice, for a total of ten minutes, with the results shown in Table 7.

TABLE 7

Third Seasoning - Double Pass Through Cooler

Temperature at Percent of Distance Down from Top of Canister (° C.)

| Canister | 0.00% | 12.50% | 25.00% | 37.50% | 50.00% | 62.50% | 75.00% | 87.50% | 100.00% | Average: |
|---|---|---|---|---|---|---|---|---|---|---|
| 1 | 40.6 | 51.7 | 55.0 | 53.9 | 52.8 | 50.6 | 49.4 | 38.3 | 27.2 | 46.6 |
| 2 | 38.9 | 52.2 | 54.4 | 52.2 | 52.2 | 50.0 | 46.1 | 44.4 | 30.0 | 46.7 |
| 3 | 40.0 | 53.9 | 53.9 | 52.2 | 51.7 | 50.0 | 46.7 | 36.1 | 31.7 | 46.2 |
| 4 | 37.8 | 52.2 | 53.3 | 52.2 | 50.0 | 50.0 | 45.6 | 35.6 | 27.8 | 44.9 |
| 5 | 38.3 | 50.6 | 52.8 | 51.7 | 52.8 | 53.9 | 51.1 | 41.7 | 30.0 | 47.0 |
| 6 | 36.7 | 51.7 | 51.7 | 50.6 | 49.4 | 47.8 | 40.6 | 30.6 | 30.0 | 43.2 |
| 7 | 37.8 | 48.9 | 52.2 | 54.4 | 52.2 | 51.1 | 46.7 | 46.7 | 31.1 | 46.8 |
| 8 | 39.4 | 52.8 | 52.8 | 52.8 | 51.1 | 47.2 | 45.0 | 37.2 | 32.2 | 45.6 |
| 9 | 37.2 | 50.0 | 55.0 | 53.9 | 48.9 | 42.2 | 37.2 | 32.8 | 27.8 | 42.8 |
| 10 | 38.9 | 55.0 | 55.6 | 53.9 | 52.2 | 50.6 | 45.0 | 38.3 | 33.9 | 47.0 |

Significantly, average temperatures for the control product were clustered around about seventy degrees, the single-pass cooled canisters had temperatures clustered around fifty, and the double-pass containers were around forty-five degrees C.

The information from the various products and treatments in Tables 1-7 is summarized in Table 8 below, using the average temperature for each canister:

TABLE 8

| Product | Minimum | Maximum | Average | Difference between test and control (° C.) |
|---|---|---|---|---|
| Seasoning 1 - Control | 73.3 | 83.3 | 79.4 | 25 |
| Seasoning 1 - Test | 46.7 | 60.0 | 54.4 | |
| Seasoning 2 - Control | 65.6 | 71.7 | 67.8 | 13.9 |
| Seasoning 2 - Test | 48.3 | 57.2 | 53.9 | |
| Seasoning 3 - Control | 66.1 | 71.7 | 69.4 | 17.2 |
| Seasoning 3 - Test | 48.3 | 59.4 | 52.2 | 23.8 |
| Seasoning 3 - Double Pass | 42.8 | 47.2 | 45.6 | |

As can be seen from Table 8, the product was cooled approximately 18° C. (30° F.) in a five period under the cooling manifold, with a further drop of just over 5° C. (10° F.) when the cooling time was doubled. When the product was shipped in a test of the procedure, the rate of implosion dropped from a high of 36% to less than 5% for the product having the first seasoning and less than 2.5% for the product having the third seasoning. Thus, in-canister cooling has been shown to be effective in cooling a stacked, porous product in a very short line distance, so that internal canister vacuum can be decreased and canister implosion reduced.

In summary, cooling product in the canister is a cost effective method that reduces capital expense when compared to cooling the product in the process area. Because there is no need for large amounts of space for cooling, this method can be used to reduce product temperature far below prior capability in the process area. Because the cooling takes place while the product is in the canister as opposed to while the product is spread out, it allows for more flexibility in line layout. The method also allows a product design to be maintained that might otherwise be too costly.

The advantages of this method are numerous and address each of the problems mentioned earlier. With this method of cooling, air blowing into the canister, even at a high velocity, does not impact the level of seasoning. Additionally, during the stacking and packaging of the chips, the oil has time to soak into the chip, preventing the stripping of the oil. With the product already stacked, the moving air cannot disrupt the stacking process by misaligning the chips. Finally, the stacked product behaves as a fin on a heat exchanger. The length of process line that must be apportioned to cooling the product is greatly decreased without adding expense. Additionally, the length of time under the manifold can be adjusted so that the product is cooled to a specific temperature that optimizes canister vacuum. For instance, if it is decided that the product is best sealed at a temperature of 43° C. (110° F.), the time under the cooler can be adjusted to achieve this temperature. Since the chips follow a serpentine path, they can be cooled for additional time without adding excessive lengths of cooling space. However, it is believed that cooling the chips below about 38° C. (100° F.) would be impractical in terms of decreasing return.

What is claimed is:

1. A method of processing a stackable, cooked food product, comprising the steps of:
   heating a plurality of food products to a predetermined temperature for a given amount of time;
   after said heating step, stacking said plurality of food products wherein said food products are stacked upon one another in a rigid container having a single opening; and
   cooling said plurality of food products while in said rigid container by blowing cooled, dry air into said single opening of said rigid container.

2. The method of claim 1, wherein said heating step comprises baking or frying.

3. The method of claim 1, wherein said stacking step involves stacking said plurality of food products into a generally cylindrical container.

4. The method of claim 1, wherein said food product is stacked at an average temperature of not less than about 82° C.

5. The method of claim 1, wherein said food product is cooled in said container by an average temperature of at least 13° C.

6. The method of claim 1, wherein said food product is cooled in said container by an average temperature of at least 18° C.

7. The method of claim 1, wherein said food product is cooled in said container by an average temperature of at least 25° C.

8. The method of claim 1, wherein said food product is cooled to an average temperature of less than about 60° C.

9. The method of claim 1, wherein said food product is cooled to an average temperature of about 45° C.

10. The method of claim 8, wherein said cooled, dry air is moving at a speed of at least about 30 kilometer per hour.

11. The method of claim 8, wherein said container spends between five and 10 minutes in said cooling step.

12. The method of claim 1, further comprising sealing said rigid container.

13. A method of processing a stackable snack chip, comprising the steps of:
    forming a dough into discrete pieces;
    cooking said discrete pieces to produce snack chips having a predetermined color and water content;
    stacking said snack chips upon one another into a rigid container having a single opening to create a chip stack having an air space within said chip stack; and
    after said stacking step, passing said rigid containers along a serpentine path underneath a stream of cooled, dry air entering said single opening to cool said stacked snack chips while in said rigid containers.

14. The method of claim 13, wherein said heating step comprises baking or frying.

15. The method of claim 13, wherein said stacking step involves stacking said plurality of snack chips into a generally cylindrical container.

16. The method of claim 13, wherein said food product is cooled in said container by an average temperature of at least 13° C.

17. The method of claim 13, wherein said food product is cooled in said container by an average temperature of at least 18° C.

18. The method of claim 13, wherein said food product is cooled to an average temperature of less than about 60° C.

19. The method of claim 13, wherein said stream of cooled, dry air is moving at a speed of at least about 30 km/hr.

20. The method of claim 13, wherein said container spends between five and ten minutes in said cooling step.

21. The method of claim 13, further comprising applying a seasoning to a first surface of said snack chips, wherein said stacking step involves stacking said food products with said first surface downward.

22. The method of claim 13, further comprising sealing said rigid container.

* * * * *